United States Patent [19]

Tellier

[11] 4,322,045
[45] Mar. 30, 1982

[54] CORD OR HOSE CADDY

[76] Inventor: Roger J. Tellier, 982 Danby Dr., Webster, N.Y. 14580

[21] Appl. No.: 177,829

[22] Filed: Aug. 13, 1980

[51] Int. Cl.³ ............................................. B65H 75/38
[52] U.S. Cl. ..................... 242/86.1; 242/99; 242/100.1
[58] Field of Search ............... 242/86.1, 100.1, 107.1, 242/107.11, 107.12, 107.13, 107.14, 107.15, 96, 99, 86.7, 86.64, 86.5 R; 191/12.2 R, 12.4

[56] References Cited

U.S. PATENT DOCUMENTS

| 972,222 | 10/1910 | Paul | 242/86.1 X |
|---|---|---|---|
| 2,565,339 | 8/1951 | Anderson | 242/100.1 |
| 2,742,242 | 4/1956 | Godwin | 242/86.1 |
| 2,888,217 | 5/1959 | Zierden | 242/86 |
| 2,906,472 | 9/1959 | Hannay et al. | 242/99 |
| 2,952,420 | 9/1960 | Von Hoorn | 242/100.1 |
| 3,529,786 | 9/1970 | Holden | 242/100.1 |
| 3,532,289 | 10/1970 | Sutz | 242/99 |
| 3,853,285 | 12/1974 | Woodring | 242/107.11 |
| 4,177,963 | 12/1979 | Takahashi et al. | 242/107.11 |

Primary Examiner—John M. Jillions
Attorney, Agent, or Firm—Stonebraker, Shepard & Stephens

[57] ABSTRACT

A cord or hose caddy 10 includes a dish-shaped resin container 11 that skids along floors or ground; a central upright shaft 12 that serves as a center of rotation; and an annular turntable 13 rotating on a low friction bearing 19 within container 11. A central hub 14 rotates with turntable 13 and forms an inclined S guide 16 arranged so half of the cord or hose winds in a lower coil on turntable 13 and the other half winds in an upper coil on top of the lower coil. Container 11 has a resin cover 15 with a winding knob 26 for rotating the turntable and confining the coils on the turntable. Diametrically opposed guide openings 23 and 24 in container 11 guide the cord or hose into the upper and lower coils. A friction drag between shaft 12 and cover 15 is applied by a cam 32 that turns with the cover to resist unwinding of the coils and releases the friction to allow free winding. The unwinding frictional drag slightly exceeds the frictional resistance of container 11 as it skids along so that no slack is unwound.

10 Claims, 7 Drawing Figures

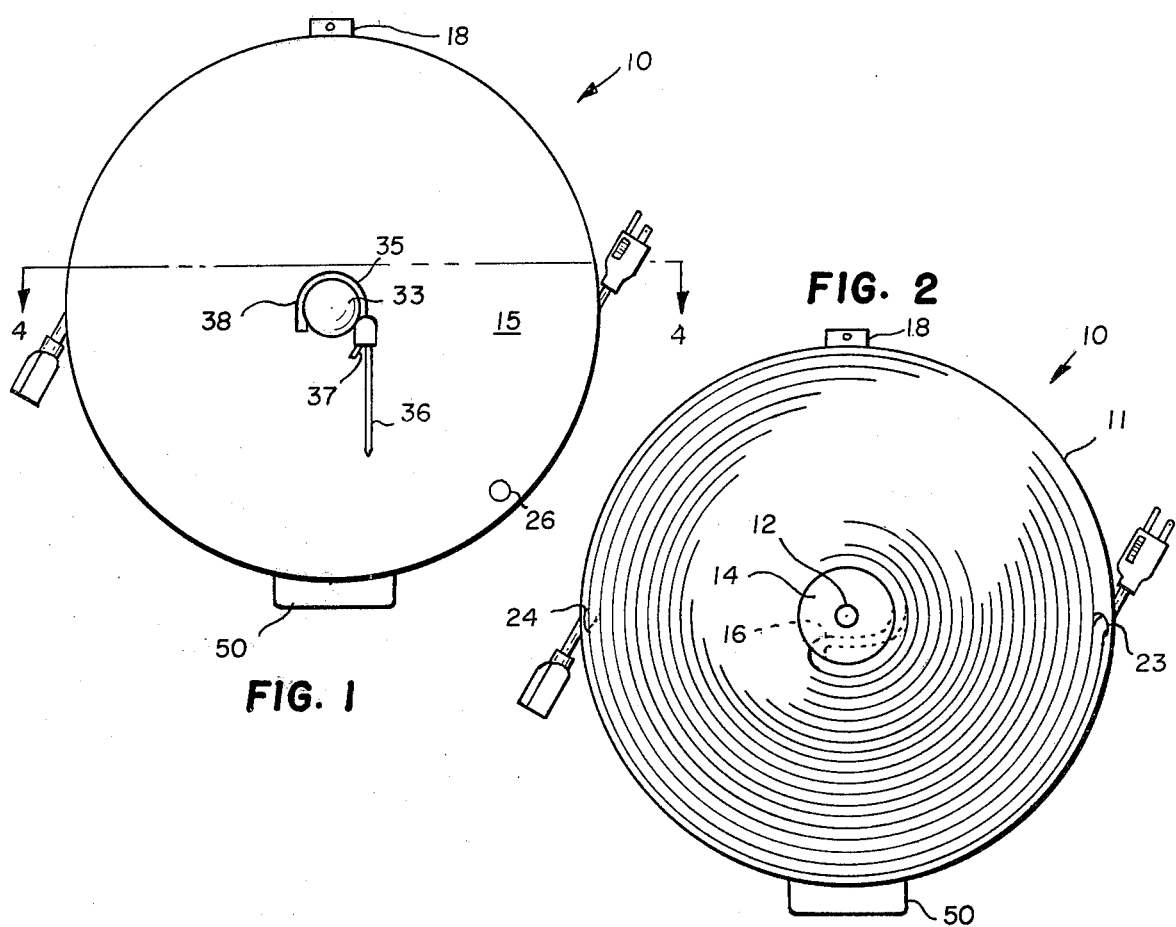
FIG. 1
FIG. 2
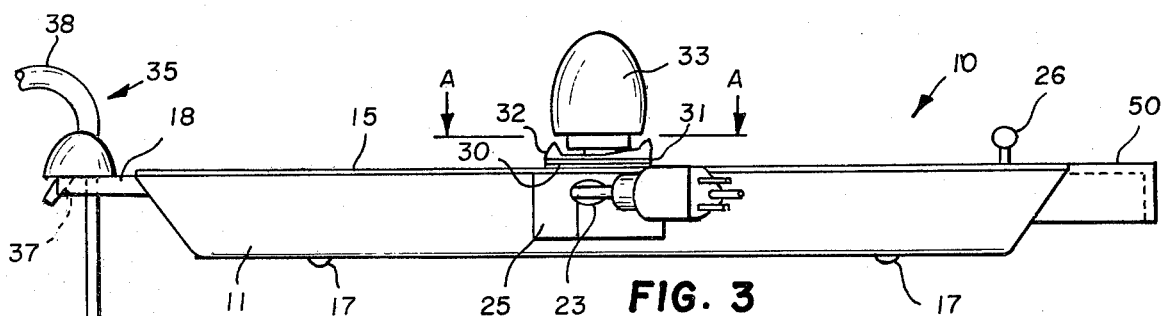
FIG. 3
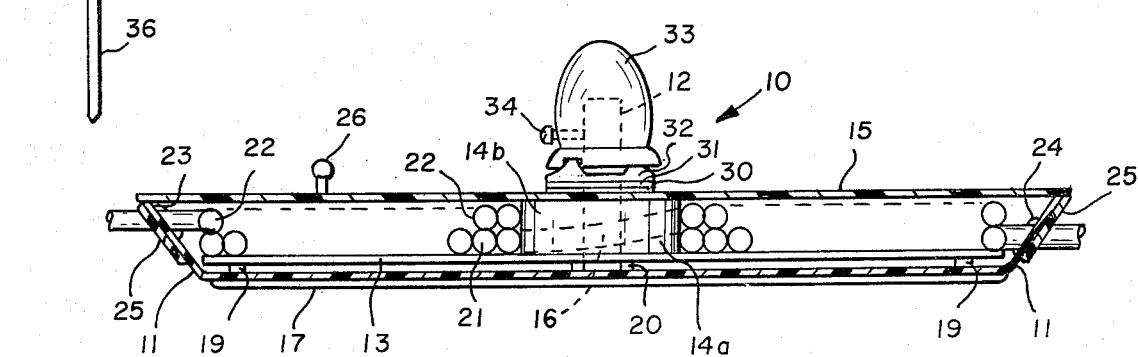
FIG. 4

CORD OR HOSE CADDY

BACKGROUND

For many decades extension cords and garden hoses have been troublesome to wind, unwind, and store; and many suggestions have been made for ways of dealing with these problems. Presently available hose reels and extension cord reels still lack in convenience, simplicity, and economy, so that winding, unwinding, and tangling problems in using cords and hoses are still experienced by millions.

I have discovered a better solution to these problems and have devised a simple, convenient, and reliable cord or hose caddy that winds, unwinds, and stores in a simple and practical way.

SUMMARY OF THE INVENTION

My inventive caddy accommodates an extension cord or a garden hose in a dish-shaped container that skids over floors or ground. A shaft upright at the center of the container serves as a center of rotation and an annular turntable rotates within the container on a low friction bearing. A central hub rotates with the turntable and is shaped to form an S guide for the central region of the cord or hose. The S guide inclines between upper and lower levels so half the cord or hose winds in a lower coil on the turntable and the other half winds in an upper coil on top of the lower coil. A resin cover with a winding knob rotates the turntable, covers the container, and confines both coils on the turntable. Diametrically opposed guide openings at upper and lower levels on the container guide the cord or hose into the two coils. A friction drag between the shaft and the cover produces an unwinding drag slightly exceeding the frictional resistance of skidding the container along. A cam movable around the shaft turns with the cover to apply friction against unwinding and release friction for easy winding. The friction drag insures that the caddy skids along behind the user as cord or hose is pulled out for use without uncoiling any slack.

DRAWINGS

FIG. 1 is a plan view of a preferred embodiment of my cord or hose caddy;

FIG. 2 is a plan view of the caddy of FIG. 1 with the cover removed;

FIG. 3 is a side elevational view of the caddy of FIG. 1;

FIG. 4 is a cross-sectional view of the caddy of FIG. 1 taken along the line 4—4 thereof.

DETAILED DESCRIPTION

Figure 5:
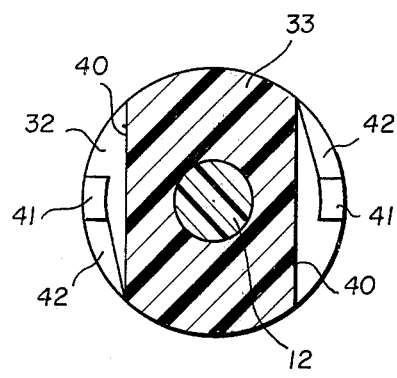
FIGS. 5-7 are cross-sectional views taken along the line A—A of FIG. 3 and show different operating positions between the cam and follower of the friction drag system.

My caddy 10 can be used for garden hoses and electrical extension cords up to 100 feet long. It stores these in a double coil allowing both ends to be unwound and wound together. A wound-up cord or hose in caddy 10 can be hung for storage and used either indoors or outdoors. Caddy 10 is only slightly larger than the coiled up cord or hose it contains, and lightweight and durable resin materials make it both convenient and economical.

The basic elements of caddy 10 are a dish-shaped resin container 11, a shaft 12, a turntable 13, a central hub 14, and a resin cover 15. Shaft 12 is fixed upright at the center of container 11 and serves as a center of rotation for turntable 13, hub 14, and cover 15. A central region of the cord or hose is fixed in an S curve 16 within hub 14 so that one-half of the cord or hose winds in a lower coil on turntable 13, and the other half of the cord or hose winds in an upper coil on the lower coil. This allows winding and unwinding of both ends of a cord or hose at the same time.

Dish-shaped container 11 is preferably molded of resin material to include upright shaft 12 and have a smooth bottom formed for skidding over floors or ground. One possible configuration for this is a pair of ridges or runners 17 oriented in the direction of movement of container 11. A tab 18 can serve for hanging the caddy for storage, and a handle 50 is useful for carrying and holding the caddy.

Turntable 13 is also preferably formed of resin material with a low profile and a low friction bearing 19 around its outer periphery to ride on the bottom of container 11. Suitable turntables 13 are presently made as molded resin lazy susans with a peripheral ball bearing 19 for rotating freely within container 11. A shoulder 20 molded around shaft 12 supports the radially inward region of turntable 13, and shaft 12 provides a center of rotation.

Hub 14 is preferably divided into a lower portion 14a joined to turntable 13 and an upper portion 14b joined to cover 15. Hub portions 14a and b are also secured together for rotation around shaft 12 and are shaped to form S guide 16 for a cord or hose.

The S shape of guide 16 is formed to pass near shaft 12 and curve into coils at its extremities. Hub 14 also inclines S guide 16 between a lower coil 21 resting on turntable 13 and an upper coil 22 resting on lower coil 21. The guide 16 is then inclined across the width of hub 14 by a sufficient amount to wind lower coil 21 directly onto turntable 13 at one end of the S and to wind upper coil 22 directly onto lower coil 21 at the other end of the S. Guide 16 is formed to avoid shaft 12 and is eccentric to hub 14 so that a cord or hose leaving one end of the S curve follows a shorter path before reaching the other end of the S curve. This shorter path is preferably allocated to upper coil 22 so that only a relatively short unsupported length of upper coil 22 is required before upper coil 22 rests on lower coil 21 following the lower path between the ends of the S curve. This supports upper coil 22 on lower coil 21 so that both coils are neatly wound without interfering with each other from hub 14 to the perimeters of turntable 13 and container 11.

Container 11 also has diametrically opposed guide openings 23 and 24 arranged respectively at the levels of lower coil 21 and upper coil 22 to help guide each half of the cord or hose into its coil level. Guide openings 23 and 24 are also horizontally oblong to permit some lateral freedom and to allow a cord or hose to enter container 11 obliquely. Oblong slots formed in container 11 to receive a cord or hose are closed along the upper edge of container 11 by clips or tabs 25 having corresponding oblong slots and secured to container 11.

Cover 15, which preferably carries upper hub portion 14b, is spaced above turntable 13 to provide comfortable clearance for the upper and lower coils. Cover 15 is also preferably circular with a freely moving fit to the upper edge of container 11 to help keep out dirt and water. Both cover 15 and container 11 are preferably rigid enough to maintain their shape during use and confine the upper and lower coils in their proper position on turntable 13 within container 11 so that coils or lengths of a cord or hose do not spill out during use. Cover 15 also preferably has a winding knob 26 that can be turned to rotate cover 15, hub 14, and turntable 13, which are all secured together for winding up a cord or hose.

Caddy 10 includes a friction drag between shaft 12 and cover 15 for automatically applying friction to resist unwinding the cord or hose and automatically releasing friction to allow free winding of a cord or hose.

Figure 6:
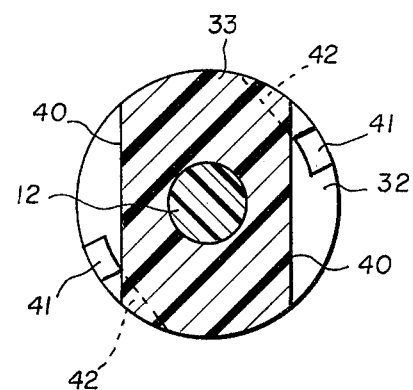
Figure 7:
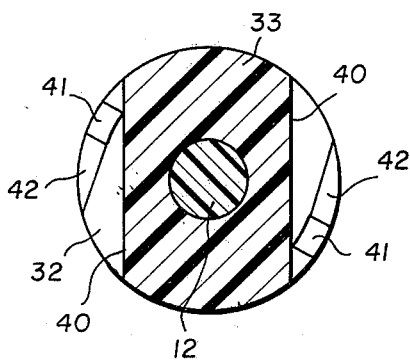

Although there are several workable alternatives for a suitable friction drag, my preferred embodiment is best shown in FIGS. 4–7. A friction surface 30 secured to cover 15 is confronted and engaged by a friction surface 31 on a cam 32 that turns freely around shaft 12. Because of the frictional engagement between surfaces 30 and 31, cam 32 moves to the limit of its rotation with movement of cover 15. A nut or cam follower 33 is secured to shaft 12 by set screw 34 and has generally parallel edges 40 that engage cam 32 to apply and release the friction drag, depending on the direction of rotaion of cover 15 relative to shaft 12. Cam 32 has a pair of diametrically opposed stops 41 and inclined cam surfaces 42 as best shown in FIGS. 5–7.

The preferred winding orientation is in the conventional clockwise direction in which cam 32 and follower 33 disengage sufficiently to release cam 32 from any downward pressure tending to hold friction surfaces 30 and 31 together. This allows friction-free winding that occurs when edges 40 of follower 33 engage stops 41 on cam 32 as shown in FIG. 7. In the unwinding, counterclockwise direction, cam 32 turns to an engagement with follower 33 that forces cam 32 downward to press friction surfaces 30 and 31 together providing a friction drag against unwinding. This occurs as the edges 40 and bottom of follower 33 ride onto inclined cam surfaces 42 to press cam 32 downward until follower 33 engages stops 41 as shown in FIG. 6.

Friction surfaces 30 and 31 are formed of suitable materials and areas so that the unwinding friction drag slightly exceeds the friction drag of skidding container 11 over floors or ground. This prevents unwinding any slack and eliminates tangling during unwinding.

Shaft 12 is preferably threaded so that cam follower nut 33 can be screwed down onto shaft 12 and set at a suitable level by set screw 34 so that cam 32 operates automatically to apply and release the friction drag of surfaces 30 and 31. As these surfaces wear down, they can be replaced by removing follower 33 and cam 32, or set screw 34 can be loosened and follower 33 turned down more tightly against cam 32 until wear surfaces 30 and 31 are consumed. A wide variety of high friction wear surfaces are available and have adequate life expectancies so that adjustment of follower 33 is rare.

An anchoring device 35 has a spike 36 for pressing into the ground, and a notch 37 for holding a cord or hose against the ground. Anchoring device 35 also preferably has a handle 38 and is shaped for storage on caddy 10, such as by handle 38 snapping around follower nut 33.

OPERATION

To use caddy 10 outdoors for an electric extension cord, caddy 10 is removed from storage and carried to the vicinity of the receptacle where the male end of the cord is plugged in. Then anchoring device 35 with its spike 36 is pressed into the ground to trap the cord in notch 37 and hold it down near the receptacle. The user then grips the female end of the cord and proceeds toward the destination of use. This pulls caddy 10 along in that direction as the cord unwinds while anchorage device 35 holds the cord securely against the pulling force applied by the user. During unwinding, cam 32 turns with cover 15 to engage follower 33 and press friction surfaces 30 and 31 together to apply a friction drag resisting the uncoiling. Since the friction drag is slightly more than the friction of skidding container 11 over the ground, the coils unwind only as container 11 moves along and produce no slack. When the user arrives at his destination, caddy 10 is half-way between there and the receptacle and has uncoiled only the amount of cord required.

When the job is done, the user goes back to the receptacle, unplugs the male end of the cord, removes anchoring device 35, and returns to caddy 10. The user can press spike 36 of anchoring device 35 through tab 18 to fasten caddy 10 to the ground for wind-up, although this is not required and wind-up can be accomplished with caddy 10 simply resting on the ground and the user holding handle 50. The user turns winding knob 26 clockwise, which releases the friction drag between surfaces 30 and 31, and turns hub 14 and turntable 13 to draw in the uncoiled lengths of the cord from both ends at once. The user has a mechanical advantage in winding knob 26 on a large radius to turn a small radius coil when long lengths of cord remain out on the ground; and as more of the cord is wound up, the coil diameter enlarges, increasing the winding speed and reducing the mechanical advantage, which is not required to draw in the diminishing lengths of cord. The winding effort is thus nearly uniform and reasonably small.

Besides conveniently coiling and uncoiling a cord or hose, caddy 10 also keeps a cord or hose neat during use and prevents accidents from tangled or looping lengths of cord or hose. Caddy 10 also has a low profile and can be made only slightly larger than a double coil of the intended cord or hose. This not only makes it compact and convenient for storage, but allows it to fit under things and stay out of the way at the work site.

For use indoors, where spike 36 of anchoring device 35 cannot be pressed into the ground, a weight, knot, or nearby object can hold the receptacle end of the cord against unplugging as the rest of the cord is uncoiled. For garden hoses, screwing the female end of the hose to a faucet holds it in place securely enough to eliminate the need for any anchorage device. Otherwise, garden hoses can be uncoiled and coiled in the same way as described for extension cords, except that caddy 10 is made slightly larger. Garden hoses also require a larger hub 14 to prevent kinking in the S curve guide and preferably contain no more than 50 feet of garden hose, compared to 100 feet of extension cord readily accommodated in caddy 10.

I claim:
1. A cord or hose caddy comprising:
   a. a generally dish-shaped resin container formed for skidding over floors or ground;
   b. a shaft fixed upright at the center of said container and serving as a center of rotation;
   c. an annular turntable rotatable within said container on a low friction bearing;

d. a central hub rotatable with said turntable and shaped to form an S guide for a central region of said cord or hose;
e. said hub being formed to incline said S guide between a lower level in the region of said turntable and an upper level spaced above said turntable so that one-half of said cord or hose winds in a lower coil on said turntable and the other half of said cord or hose winds in an upper coil on said lower coil;
f. a resin cover formed to overlie said container and rotate with said turntable;
g. said cover being spaced over said turntable to confine said upper and lower coils of said cord or hose on said turntable;
h. said container having diametrically opposed guide openings arranged at said upper and lower levels for guiding said cord or hose into said upper and lower coils;
i. a friction drag between said shaft and said cover;
j. a cam movable around said shaft and turned by rotation of said cover for applying said friction drag against unwinding said cord or hose and releasing said friction drag to allow free winding of said cord or hose;
k. said friction drag having opposed friction surfaces producing an unwinding drag that slightly exceeds the frictional resistance of skidding said container over floors or ground; and
l. said cover having a winding knob.

2. The cord or hose caddy of claim 1 wherein said hub is formed of a lower piece joined to said turntable and an upper piece joined to said cover.

3. The cord or hose caddy of claim 1 wherein said cord or hose is arranged in said S guide so said lower coil rotationally precedes said upper coil and provides support for said upper coil.

4. The cord or hose caddy of claim 1 wherein said shaft is molded with said container.

5. The cord or hose caddy of claim 4 including a follower secured to said shaft and engaging said cam.

6. The cord or hose caddy of claim 1 wherein said guide openings are horizontally oblong.

7. The cord or hose caddy of claim 1 including an anchoring device having a spike for pressing into the ground and a notch for holding said cord or hose against the ground.

8. The cord or hose caddy of claim 7 wherein said anchoring device has a handle and is configured for storage on said caddy.

9. The cord or hose caddy of claim 7 wherein said container has a peripheral hanger for hanging said caddy for storage.

10. The cord or hose caddy of claim 9 wherein said spike of said anchoring device can fit through said hanger for holding said caddy to the ground during winding.

* * * * *